United States Patent Office 3,342,212
Patented Sept. 19, 1967

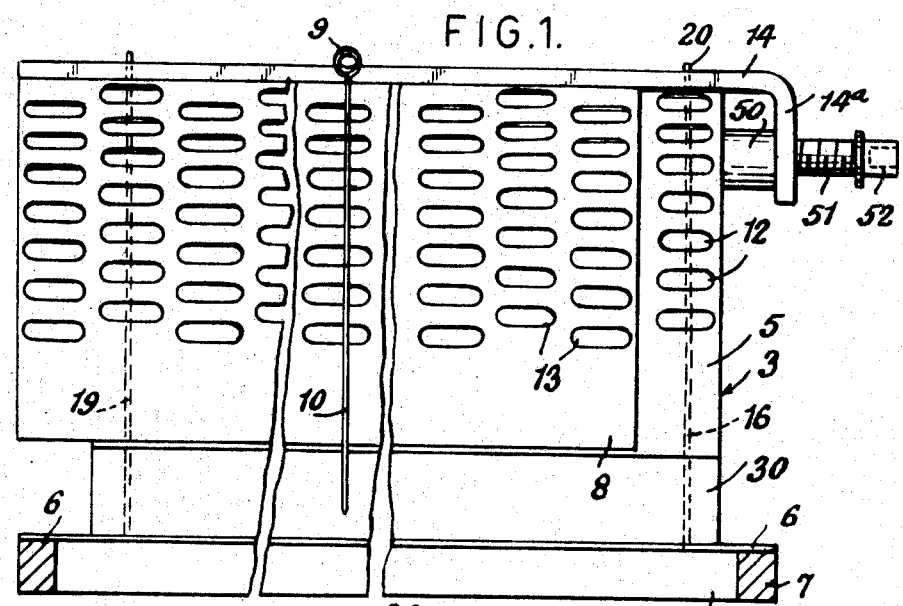
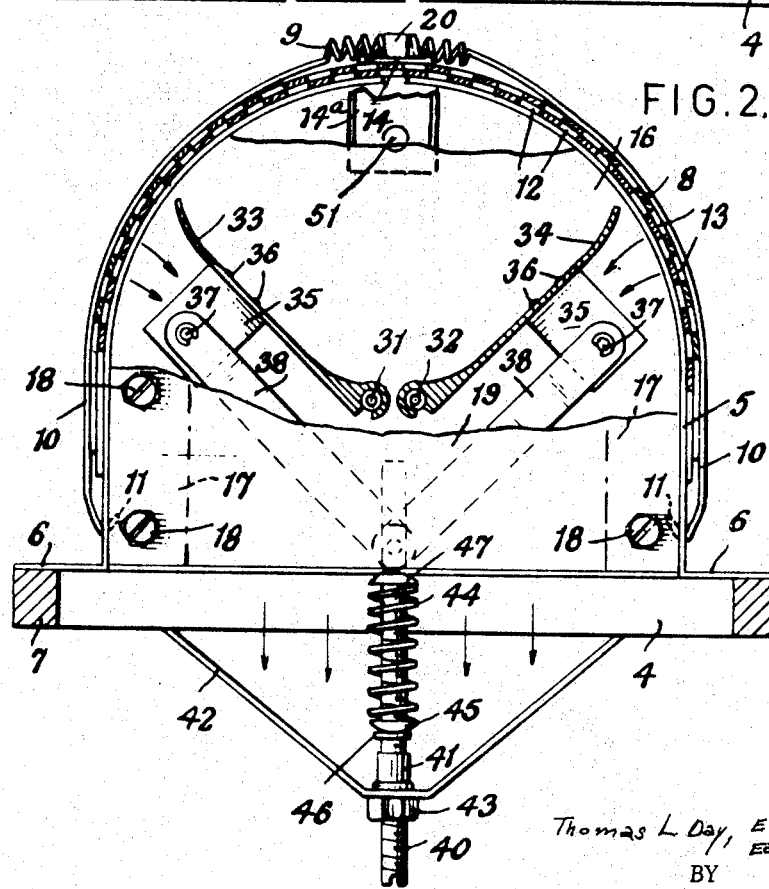
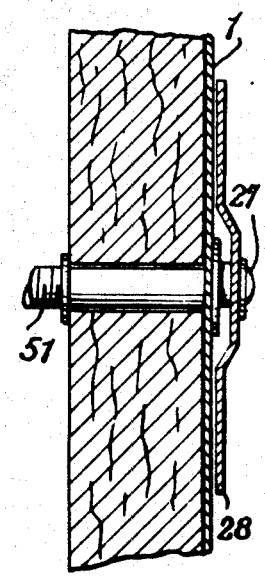

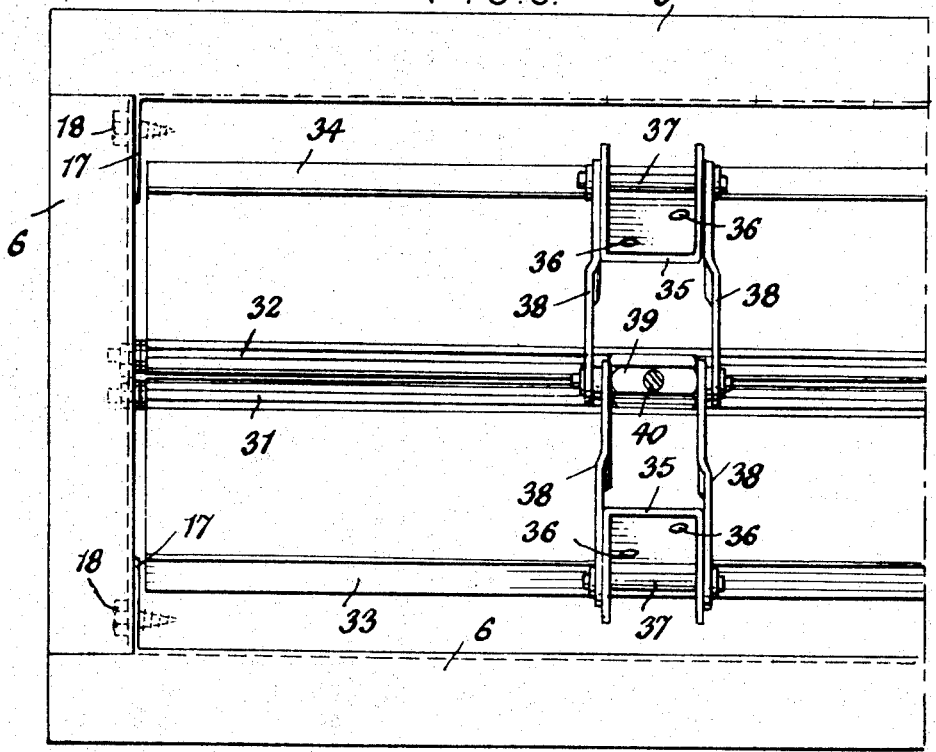
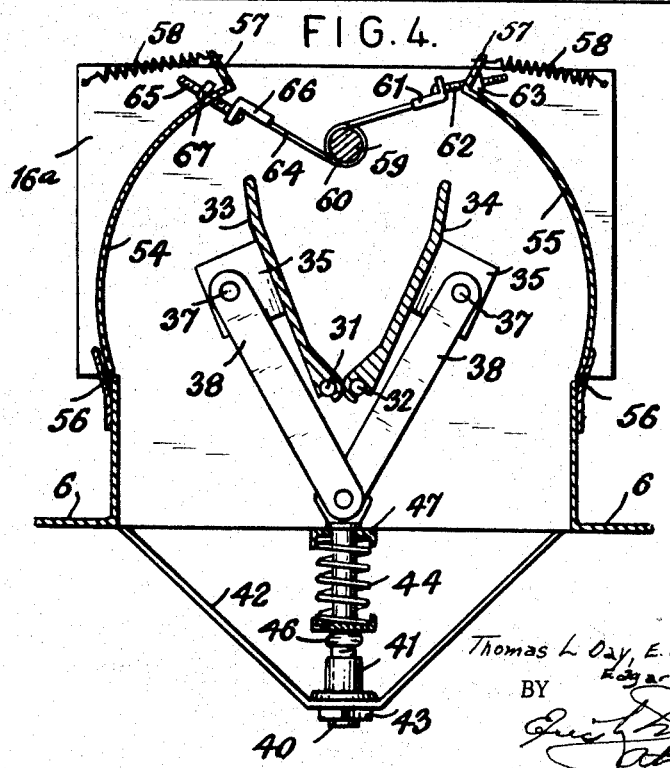

3,342,212
VOLUME TEMPERATURE CONTROL DEVICE FOR AIR OUTLET DEVICES
Thomas L. Day, Brookfield, Elbert Gordon Stocks, Jr., Brookfield Center, and Edgar J. Totsas, Danbury, Conn., assignors to Connor Engineering Corporation, Danbury, Conn., a corporation of New York
Filed Dec. 4, 1963, Ser. No. 328,084
2 Claims. (Cl. 137—613)

This invention relates to air-conditioning apparatus and more particularly to an air outlet device which limits the outflow of air to a required volume.

It is an object of the invention to provide a device of this character having several means for adjusting the control of air flow with precision and accuracy.

It is also an object of the invention to provide a control device of this kind which can be mounted in an air-mixing plenum or chamber to control the total flow of mixed hot and cool air therefrom. This control is to be repeatably accurate in response to its setting so that the adjustment device can be calibrated directly in the rate of air flow.

In general, the invention contemplates the use of an automatic constant volume damper which employs spring means to resist the force exerted on moving vanes by upstream air pressure and matches any movement due to change in pressure to the degree of dampering required to maintain a constant rate of air flow. Overlying this automatic volume damper is a device for resetting the rate of air flow without making any change in the spring means or the vanes or connecting linkage. A feature of novelty in the invention resides in the separation of dampering functions so that each retains its proportionate effect regardless of the position of the other. Thus, at any setting of the overlying device the pressure actuated vanes will respond to changes in pressure to keep the air flow rate constant as the pressure fluctuates. Conversely at any one pressure, the vanes will remain constant in position and the amount of net open damper area can be varied by the overlying device to some required setting in rate of air volume. This combination of dampering functions affords a means by which the adjustment of the overlying device can be calibrated, as on a vernier dial, directly in units of air flow and yet the force of the spring means in the vane assembly can be independently adjusted to allow for dimension changes due to manufacturing tolerances, etc.

More particularly, this invention includes a housing or casing provided with internal pivoted vanes and spring-operated mechanism to hold the vanes in position against the force exerted by upstream air pressure, and an overlying mechanism for adjusting the dampering effect of the vane movement. The overlying mechanism is shown in two types, one of which consists of a pair of foraminous hood sections mounted so that one is slidably movable relatively to the other to more or less align their openings, thereby controlling the effective net open area through which the air flows, and the second consists of a pair of arched outer covers hinged at one end approximately tangent to the radius of curvature of the inner pivotal vanes, and a means for adjusting the angle of divergence from tangency, thereby controlling the cross-sectional area between the end of the pivotal vanes and the arched covers through which the air flows.

With these and other objects to be hereinafter set forth, we have devised the arrangement of parts to be described and pointed out in the claims appended hereto.

In the accompanying drawings, wherein two embodiments of the invention are illustratively disclosed:

FIG. 1 is a top plan view of the air outlet device as constructed according to one embodiment of the invention;

FIG. 2 is an end view as seen from the right of FIG. 1;

FIG. 3 is a portion of the air outlet device as seen from the downstream side or as seen from below in FIG. 2, and showing the part of the pivoted vane linkage, and FIG. 4 is an end view similar to FIG. 2, with parts in section, and showing an alternate overlying adjustment mechanism. FIG. 5 shows the vernier dial.

An air outlet constructed in accordance with the present invention is adapted for use in air-conditioning apparatus and more particularly in an air-mixing chamber or plenum wherein hot and cold air is mixed to a required temperature and then released in controlled quantity through the outlet device of the present invention. The mixing chamber or plenum in which the outlet device is located, may be of known construction and is in the form of a metallic housing, a portion of which is shown at 1 in FIG. 5 and it is preferably lined with a suitable insulating material 2.

The outlet device of the present invention is generally indicated at 3, and it is located inside of the mixing chamber or plenum and the air enters through apertures in the hood sections or covering of the device, substantially as shown by the arrows in FIG. 2 and passes out through the opening 4 and through a suitable duct into the room.

The outlet device includes a casing or housing 30 which has an inner hood section or metallic cover member 5 of curved or arched shape and which is provided with laterally-extended flanges 6 by means of which it can be attached to a frame 7 that is secured over the outlet opening of the mixing chamber or plenum.

Mounted on top of the inner hood section or cover member 5 is an outer, longitudinally-slidable outer hood section or cover member 8 which closely conforms in shape to the inner hood section 5 and is adjustable relatively to the same. The outer hood section 8 is held in close contact with the inner cover or hood section 5 by means of two coil springs 9 extending over the top of the casing, this spring having extended legs 10 terminating in hooked ends 11 entering into holes provided in the side walls of the stationary inner hood section 5. The inner hood section 5 is provided with a plurality of spaced apertures or slot-like openings 12 so that the greater portion of said hood section is in fact foraminous. The slidable outer hood section 8 is similarly apertured or slotted as shown at 13 so that this hood section is for a substantial portion of its area, foraminous. The arrangement of the slot openings in the two contiguous hood sections 5 and 8 is such that by the slidable adjustment of the outer hood section 8 relatively to the inner hood section 5, the effective size of the air passage openings through the casing can be regulated.

Secured to the top of the slidable outer hood section 8 is a longitudinally-extending channel bar 14, which extends along the center line of the casing and has one end projecting beyond the end of the casing. Said projecting end of the bar 14 is laterally bent as shown at 14a. The casing is closed at one end by means of a stationary end wall 16, secured to inturned flanges 17 of the inner hood section by means of screws 18, and a similar end wall 19 closes the opposite end of the casing and is secured in like manner to flanges 17. Each of the end walls 16 and 19 has a projecting tongue 20 which passes through slots in the hood sections 5 and 8 and also through slots in the bar 14 to permit the sliding movement of the outer cover member or hood section 8.

The laterally-bent end 14a of the bar 14 is provided with a boss 50 through which a spindle 51 is threadable. One end of the spindle 51 is rotatably supported in the end wall 16 of the casing and the opposite end protrudes beyond the part 14a as shown in FIG. 1 and is provided with a socketed end 52 for engagement by a suitable tool to thus turn the spindle 51 and cause the longitudinal movement of the bar 14 and the outer hood section to which the bar 14 is attached, thus adjusting the position of said hood section relatively to the inner stationary hood section 5.

A suitably calibrated vernier or reduction dial 28 is provided on the outer side of the wall 1 of the plenum chamber behind the head 27, and by which the adjustment of the outer hood section can be determined and indicated when set in a desired position, this operation being performed from the outside of the plenum chamber.

Pivotally mounted on pivot rods 31 and 32 in the end walls of the casing, are air deflectors or vanes 33, 34 which control the flow of air from the casing 30. Secured to the rear face of each of these vanes by rivets or bolts 36 is a U-shaped bracket 35, connected by a pivot pin 37 to one end of a pair of parallel links 38, which have their opposite ends pivotally connected to a sliding block 39. A threadable adjusting rod 40 is slidable through the block 39, said rod being threadably adjustable through a bushing 41 carried in a supporting bracket 42. A lock nut 43 is provided on the rod 40. Surrounding the rod 40 is a coil spring 44 which has one end seated on a cupped washer 45 resting on a shoulder 46 on the rod 40. The opposite end of the spring 44 rests against a cupped washer 47 and urges the same against the block 39. By means of this arrangement the force of the spring against the block 39 can be regulated and the rate of movement of the vanes 33, 34 controlled.

From the foregoing, the operation of the improved air outlet device will be readily apparent. By the rotation of the spindle 51 the outer hood section 8 will be slidably moved to a desired position relatively to the inner hood section 5 to secure the required overlapping effect of the slot openings 12, 13 in the two foraminous cover members or hood sections. A dial which can be suitably coupled to the spindle 51 will serve to indicate the various settings or relationship of the two hood sections.

By the adjustment of the rod 40, the two vanes 33 and 34 can be set to the required rate of movement to allow the passage of air in the required volume, and as shown by the arrows in FIG. 2. Should the volume of air entering the casing 30 increase and create extra pressure on the vanes, the vanes will be forced in the direction of closing against the force of the spring 44. When the volume of air in the casing is reduced, the spring 44 will become effective to restore the vanes to the position required for the desired air flow into the room.

It will thus be seen that by the regulation of the effective sizes of the apertures in the walls of the casing and by the control of the vanes, an effective and precise control of the air flow will be attained.

In the embodiment shown in FIG. 4, the casing includes a pair of arcuate cover members 54 and 55. Each of the cover members is hinged at one end as shown at 56 to the respective side walls of the casing and approximately tangential to the radius of pivotal movement of the inner pivotal vanes 33 and 34.

Each of the arched cover members 54 and 55 is provided with an off-set end 57 engaged by one end of a coil spring 58 which has its opposite end attached to the end wall 16a of the casing. The adjusting means for bringing the cover members toward or away from one another includes a rod 59 extending for the length of the casing, and having one end extended beyond the same for engagement to rotate said rod. The rod 59 has a flexible cable or wire 60 wrapped around it. One end of the cable is attached to an angle piece 61 through which a bolt 62 passes, said bolt extending through the cover member 55 at the off-set end thereof, and having a nut 63. The opposite end 64 of the cable or wire 60 connects to an angle piece 66 carrying a bolt 65 which extends through the cover member 54 and carries a nut 67.

It will be obvious that by the rotation of the rod 59, the cable 60 will be wound or unwound on the rod and the adjustment between the cover members 54 and 55 made accordingly. This adjusts the angle of the vanes from tangency, thereby controlling the cross sectional area between the ends of the pivotal vanes and the cover members.

It will thus be seen that by the regulation of the effective net damper opening and by the movement of the pressure responsive vanes, an effective and precise control of the air flow will be attained.

Having thus described two embodiments of the invention it is obvious that the same is not to be restricted thereto, but is broad enough to cover all structures coming within the scope of the annexed claims.

What we claim is:

1. In an air-conditioning device, an air outlet having a casing composed of a pair of arched overlying hood sections closed by end walls, the outermost of said hood sections having a limited movement relatively to the innermost hood section, both of the hood sections being provided with a plurality of apertures capable of being wholly or partially disaligned by the adjustment of the outermost hood section, spring means attached to the inner hood section and the outer hood section resiliently biasing the outer section toward the inner section to maintain close contact between the two sections, a bar secured to the outside of the outermost hood section, said bar having an end extending beyond said hood section, a spindle threadable through the bar, and a chamber wall through which the spindle is adjustable, and means on the outer side of the wall for making such adjustment of the spindle.

2. In an air-conditioning apparatus, an air outlet device having a housing, said housing including a stationary foraminous inner hood section, an outer foraminous hood section slidably mounted over the inner hood section and adjustable to regulate the extent of registry of its openings with those in the inner hood section, spring means attached to the inner hood section and the outer hood section resiliently biasing the outer section toward the inner section to maintain close contact between the two sections, a pair of pivotal air-pressure responsive vanes located in the housing, means for adjusting the rate of movement of the vanes to pivotally move them to or from the center line of the housing to thereby control the amount of the net open area of the hood sections through which the air may pass, wherein the outer hood section carries an external centrally-disposed bar extending along its top, said bar having an angular end, a spindle threadably mounted in said end, whereby rotative movement of the spindle will slidably move the outer hood section to positions of adjustment wherein the outlet device is mounted in a plenum chamber, the spindle being rotatively adjustable externally of said chamber, and means for indicating the position of the rotative adjustment of the spindle.

References Cited
UNITED STATES PATENTS

| 2,248,381 | 7/1941 | Pedersen | 251—264 |
| 2,293,956 | 8/1942 | Walthers | 137—518 |
| 2,896,849 | 7/1959 | Argentieri et al. | 137—613 X |
| 3,115,896 | 12/1963 | Roberts et al. | 137—556.6 X |
| 3,179,125 | 4/1965 | O'Day et al. | 98—41 X |

WILLIAM F. O'DEA, *Primary Examiner.*

D. H. LAMBERT, *Assistant Examiner.*